United States Patent Office 3,073,678
Patented Jan. 15, 1963

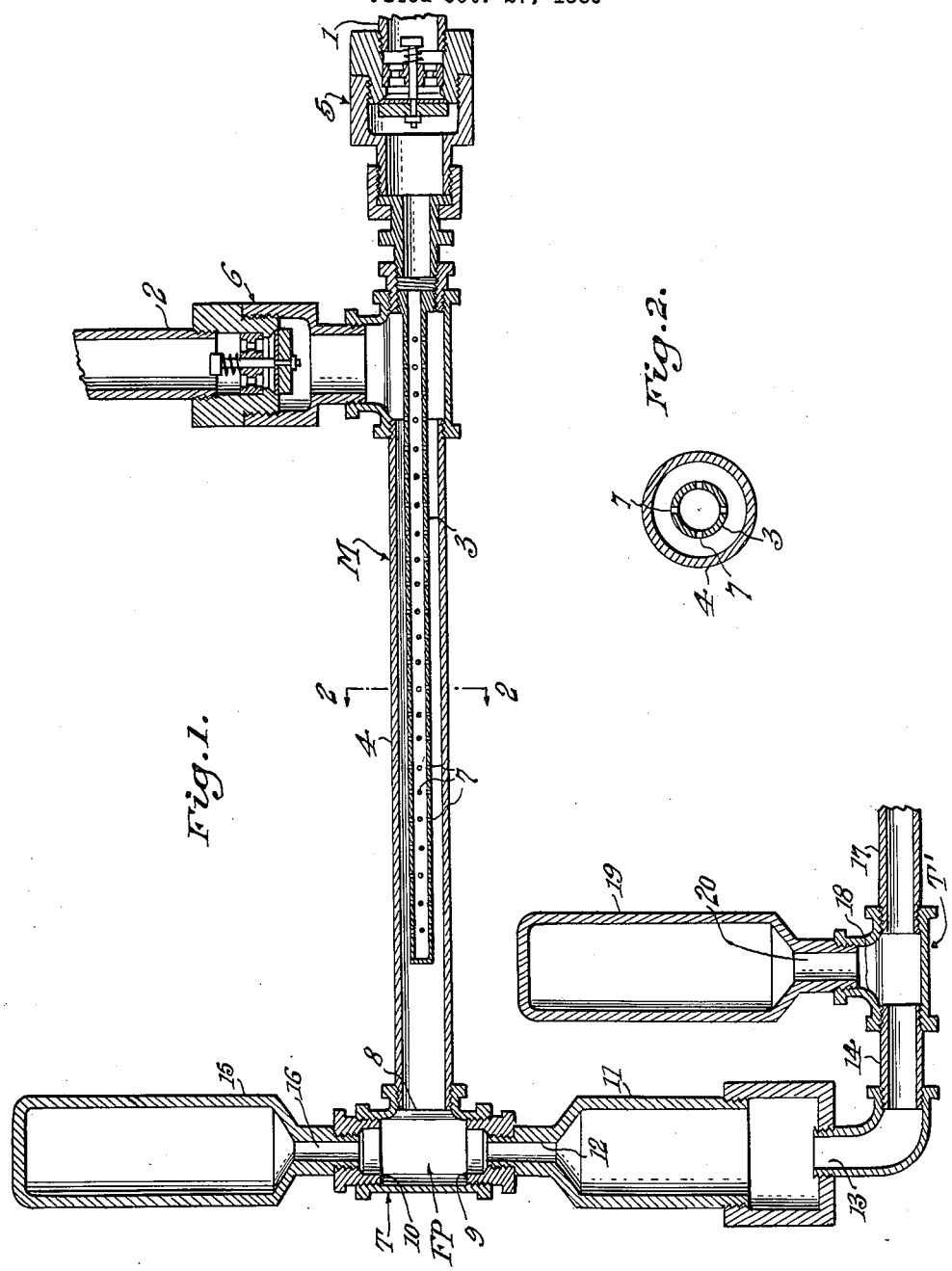

3,073,678
METHOD OF AND APPARATUS FOR
PREPARING AQUA AMMONIA
John W. Dugan, Houma, La.
(P.O. Box 66, Gray, La.)
Filed Oct. 27, 1960, Ser. No. 65,420
14 Claims. (Cl. 23—193)

This invention relates to methods of and apparatus for preparing aqua ammonia, and particularly to the preparation of aqua ammonia by the dispersion of liquid anhydrous ammonia in water, or solutions comprising water and an additive, for example potassium chloride.

Various methods and apparatuses for producing aqua ammonia by the dispersion of liquid anhydrous ammonia in water have previously been known. In one typical example, liquid anhydrous ammonia is dispersed by eduction in a large volume, e.g. a tank, of water. When the concentration of the ammonia solution produced in this way is to be high, for example more than a usual 25% concentration, pockets or slugs of gaseous ammonia have remained undissolved to the extent that it has been proposed to remove the undissolved gaseous component by scrubbing with water in a scrubber connected to but located as a unit outside of the main mixing chamber or tank, the scrubbing water with the gaseous ammonia then dissolved therein being conducted to the tank. In another typical prior art procedure, as shown for example in the United States patent to John W. Dugan No. 2,872,297, granted February 3, 1959, liquid anhydrous ammonia and water are delivered continuously to a mixing device comprising concentrically arranged tubes at least one of which is formed with a multiplicity of perforations or apertures through which one of the mixture components flows outwardly for dispersion in the other mixture component.

It has been the general practice to observe an upper limit of 25% ammonia concentration in solutions previously prepared by dispersing liquid anhydrous ammonia in water because it has been found that when attempts have been made to produce higher concentrations, the mixture includes a considerable amount of undissolved ammonia in the form of slugs of gas. When the mixture is delivered for use, for example for application to the ground in fertilizing operations, the mixture flows out as an erratically pulsating or sputtering stream, somewhat of the nature of a stream of water first flowing from a garden hose containing air. Aside from the obvious inefficiency of using aqua ammonia delivered as an erratically pulsating stream, a large amount of ammonia is released to the air and thereby wasted.

An object of the invention is to provide a method of producing aqua ammonia by dispersing liquid anhydrous ammonia in a liquid comprising water in such a manner that, even when the solution is to be of more than the usual 25% concentration, the aqua ammonia may be delivered for use in a smoothly flowing stream substantially free from bubbles or slugs of gaseous ammonia. In its general nature, the method involves, inter alia, the conducting of an initial mixture of liquid anhydrous ammonia and water, containing a liquid aqua ammonia component and a gaseous component in the form of dispersed slugs of ammonia, to flow along a path and to be so controlled and directed that the liquid component continues to flow through the path to a point of discharge, and the gaseous component is diverted from the path, reduced to liquid form, and then returned to the flowing main liquid component.

Another object of the invention is to provide a simple and effective apparatus for enabling the practicing of the method.

One form of apparatus which has been found effective for practicing the method is illustrated in the accompanying drawing, in which:

FIGURE 1 is a largely schematic view of the preferred form of apparatus, important dimensional relationships, however, being shown substantially to scale; and FIGURE 2 is a transverse section of a mixing device, the section being taken on the line 2—2 of FIGURE 1.

In the illustrated form of apparatus, a pipe 1 provides for the introduction of liquid anhydrous ammonia and a pipe 2 for the introduction of a liquid comprising water to a preliminary or initial mixing device generally designated M which serves to disperse the liquid anhydrous ammonia in a flowing stream of water to effect initial mixing. The mixer M is of the concentric tube type and is similar, in some respects, to the mixer shown in the Dugan Patent 2,872,297 referred to above. The mixer M is, however, of simplified form and comprises a central tube 3 for the introduction of liquid anhydrous ammonia and an outer tube 4 through which the water flows continuously. A pressure controlling check valve 5 in the pipe line 1 prevents any reverse flow of liquid anhydrous ammonia and a pressure controlling check valve 6 similarly serves to prevent reverse flow of water. The central tube 3 is formed with perforations or apertures 7 through which liquid anhydrous ammonia flows radially outwardly in small jets or streams into the space between the tubes 3 and 4 for being dispersed and dissolved in water flowing through this space.

As previously indicated, it is intended that the method and apparatus according to this invention be used when it is intended to produce aqua ammonia solutions of such high concentration as to tend to cause some of the ammonia to emerge from the mixer in the form of gaseous slugs. The initial mixture discharged by the mixer M will therefore contain such gaseous slugs which, if not removed or changed as to their physical characteristics, would produce the undesirable pulsating flow. In accordance with the present invention, the initial mixture is conducted to flow from the mixer M to a relatively unrestricted flow path or conduit generally designated FP which includes the outer or discharge end of the mixer M at the left of the central tube 7, and a T fitting T, having a central mixture receiving opening 8, a downwardly directed opening 9, and an upwardly directed opening 10.

The opening 9 communicates with a lower chamber or bottle 11 through a neck 12 at the top of the chamber. The neck 12 is of such size as to provide a restricted flow device through which the liquid component of the initial mixture flows downwardly into the expansion space within the bottle 11. The liquid component remains in liquid form as it passes downwardly through the lower expansion space and flows outwardly from the latter through a neck 13 to a delivery pipe 14.

The upwardly directed T opening 10 communicates with an upper chamber or bottle 15, closed at its upper end, through a neck or flow restriction device 16 which, by virtue of the formation of the T fitting, is disposed directly above the lower flow restriction device 12. The liquid component of the mixture, i.e. aqua ammonia, flowing through the T fitting is of such specific gravity as to flow only downwardly through the T and the neck 12 into the expansion chamber 11, no substantial part of the liquid component flowing upwardly into the chamber 15.

As the initial mixture enters the T, the slugs of gaseous ammonia dispersed in the aqua ammonia, being light, are diverted and rise within the T and flow through the neck 16 into the chamber 15. The neck 16, being of restricted flow area, causes the emerging gaseous ammonia to expand in confinement in the chamber 15 with resultant drop in temperature, and condensation. The ammonia, after being condensed to liquid form of relatively high specific gravity, then descends through the neck 16 and is re-introduced into the flow path FP in which it is mixed again, but now in liquid form, with the liquid component of the initial mixture. The flowing of the total liquid component, that is the liquid component of the initial mixture augmented by the condensed initially gaseous component, through the neck 12 into the expansion chamber 11 is accompanied by expansion but not evaporation of the condensed ammonia, and this produces a more uniform concentrated mixture.

It has been found that the conversion of the gaseous component in the initial mixture into a liquid component combinable with the liquid component part of the initial mixture cannot be achieved successfully without the flowing of the initially gaseous slug components through a restricted flow device with subsequent expansion, cooling and condensation. The relative sizes of the flow areas in the flow path FP and in the restricted flow devices, particularly within the neck 16, are important. In the form of apparatus shown, the diameter of each of the relatively unrestricted flow path openings 8, 9 and 10 is approximately 1.32", and the diameter of each of the relatively restricted flow path openings or necks 12 and 16, which are, in effect, orifices, is approximately 0.6", the conduit or relatively unrestricted flow path diameters thus being about twice the neck opening diameters. With such a relation of conduit and restricted flow diameters, solutions of considerably higher concentration than the usual 25% may be produced so as to be substantially free from gaseous ammonia at the point of delivery.

When producing aqua ammonia solutions of very high concentration, it may be desirable to provide for the conversion into liquid form of any small amounts of gaseous ammonia which may be present in the solution discharged by the expansion chamber 11. For this purpose, the discharge pipe 14 may be arranged to deliver through a further T fitting T', so formed and connected to the pipe 14 as to enable the liquid component to flow straight through the fitting T' to a final discharge pipe 17. The fitting T' is provided with an upper opening 18 which communicates with a further closed expansion chamber 19 by way of a restricted flow device or neck 20. The operation at this part of the system is similar to that described with reference to the expansion chamber 15 and neck 16, that is to say any gas bubbles or slugs included in the mixture flowing through the fitting T' will rise through the neck 20 and will expand on entering the space within the bottle 19. Again, the expansion effects a cooling and condensation of the gaseous ammonia, enabling the liquid condensate to return reversely through the neck 20 to be picked up by the main liquid component flowing through the fitting T'.

Although the invention has been described with reference to producing aqua ammonia by dissolving liquid anhydrous ammonia in water, the invention may also be practiced in the dissolving of liquid anhydrous ammonia in solutions containing other constituents, e.g. solutions of potassium chloride in water.

The method and apparatus described are representative of preferred procedures and equipment for practicing the invention, but it is intended that the disclosure be illustrative rather than definitive, the invention being defined in the claims.

I claim:

1. A method of producing aqua ammonia by forming a solution of liquid anhydrous ammonia in water, said method comprising dispersing liquid anhydrous ammonia in a liquid comprising water and thereby forming an initial mixture comprising aqua ammonia and slugs of ammonia vapor dispersed in said aqua ammonia; conducting said initial mixture to a flow path and conducting the aqua ammonia to flow through said path; diverting said slugs of ammonia vapor from said flow path and away from the aqua ammonia flowing through said flow path; expanding said slugs in confinement while diverted away from said flow path whereby to cool and condense said slugs into condensed ammonia still away from said flow path; and returning the condensed ammonia to said flow path for solution in the aqua ammonia flowing therethrough.

2. A method of producing aqua ammonia by forming a solution of liquid anhydrous ammonia in water, said method comprising dispersing liquid anhydrous ammonia in a liquid comprising water and thereby forming an initial mixture comprising aqua ammonia and slugs of ammonia vapor dispersed in said aqua ammonia; conducting said initial mixture to a flow path and conducting the aqua ammonia to flow through said path; diverting said slugs of ammonia vapor from said flow path and away from the aqua ammonia flowing through said flow path; expanding said slugs in confinement while diverted away from said flow path whereby to cool and condense said slugs into condensed ammonia still away from said flow path; returning the condensed ammonia to said flow path; and expanding the so returned condensed ammonia as it flows along said path with the aqua ammonia to effect a solution of the expanded condensed ammonia in the aqua ammonia.

3. A method of producing aqua ammonia by forming a solution of liquid anhydrous ammonia in water, said method comprising dispersing liquid anhydrous ammonia in a liquid comprising water to form an initial mixture containing aqua ammonia solution and slugs of ammonia vapor dispersed in said aqua ammonia; connecting the aqua ammonia solution through a relatively unrestricted flow path downwardly through a first relatively restricted flow path into a first expanded space; conducting the slugs of ammonia vapor from said relatively unrestricted flow path upwardly away from said solution through a second relatively restricted flow path into a second and closed expanded space thereby to effect expansion, cooling, and condensation of said slugs while confined within said second expanded space and away from said aqua ammonia solution; re-introducing the condensed ammonia from said second expanded space into said relatively unrestricted flow path for admixture with the aqua ammonia solution flowing therethrough; and conducting said condensed ammonia through said first relatively restricted flow path together with aqua ammonia flowing therethrough and expanding the condensed ammonia within said first expanded space.

4. A method of producing aqua ammonia by forming a solution of liquid anhydrous ammonia in water, said method comprising dispersing liquid anhydrous ammonia in a liquid comprising water to form an initial mixture containing aqua ammonia solution and slugs of ammonia vapor dispersed in said aqua ammonia; conducting the aqua ammonia solution through a relatively unrestricted flow path downwardly through a first relatively restricted flow path into a first expanded space; conducting the slugs of ammonia vapor from said relatively unrestricted flow path upwardly away from said solution through a second relatively restricted flow path into a second and closed expanded space thereby to effect expansion, cooling, and condensation of said slugs while confined within said second expansion space; conducting said condensed ammonia away from said second expansion space; and expanding said condensed ammonia into said first expanded space.

5. Method according to claim 3 in which said flow paths are circular in cross section and in which the diameters of said first and second relatively restricted flow paths are approximately one-half the diameter of said relatively unrestricted flow path.

6. Method according to claim 5 in which said first and second relatively restricted flow paths are restricted by orifice openings.

7. Method according to claim 3 in which said second relatively restricted flow path is above said first relatively restricted flow path, with said relatively unrestricted flow path intervening immediately between said relatively restricted flow paths.

8. Method according to claim 3 including also conducting the mixture from said first expanded space to a third restricted flow path, expanding any remaining slugs of ammonia vapor through said third restricted flow path into a third enlarged space whereby to cool and condense said slugs; and returning the condensed ammonia from said third enlarged space reversely through said third restricted flow path to rejoin the aqua ammonia solution.

9. A method of producing aqua ammonia in solution with potassium chloride, said method comprising dispersing liquid anhydrous ammonia in a liquid comprising potassium chloride in solution with water and thereby forming an initial mixture comprising a liquid component including aqua ammonia in solution with potassium chloride and a gaseous component comprising slugs of ammonia vapor dispersed in said liquid component; conducting said initial mixture to said flow path and conducting the liquid component of said mixture to flow through said path; diverting said slugs of ammonia vapor from said flow path and away from said liquid component; expanding said slugs in confinement while diverted from said liquid component whereby to cool and condense said slugs into condensed ammonia still away from said liquid component; and returning the condensed ammonia to said flow path for solution in the liquid component flowing therethrough.

10. Apparatus for producing aqua ammonia comprising a mixer; means for introducing a liquid comprising water into said mixer; means for introducing anhydrous ammonia into said mixer for being mixed with said liquid; a conduit for receiving the mixture flowing from said mixer; means providing a path for flow of the liquid component of said mixture and comprising a first expansion chamber and a flow restriction device intervening between and connecting said conduit and said first expansion chamber; a gas expanding and condensing means comprising a second expansion chamber positioned above said conduit and a second flow restriction device also positioned above said conduit and intervening between and connecting said conduit and said second expansion chamber, both of said flow restriction devices being of substantially less flow path cross sectional area than said conduit; and means for removing the mixture from said first expansion chamber.

11. Apparatus for producing aqua ammonia comprising a mixer; means for introducing a liquid comprising water into said mixer; means for introducing anhydrous ammonia into said mixer for being mixed with said liquid; a conduit for receiving the mixture flowing from said mixer; means providing a path for flow of the liquid component of said mixture and comprising a first expansion chamber positioned below said conduit and a flow restriction device intervening between and connecting said conduit and said first expansion chamber; a gas expanding and condensing means comprising a second expansion chamber positioned above said conduit and being closed at its upper end and a second flow restriction device also positioned above said conduit and intervening between and connecting said conduit and said second expansion chamber, both of said flow restriction devices being of substantially less flow path cross sectional area than said conduit; and means for removing the mixture from the lower part of said first expansion chamber.

12. Apparatus according to claim 11 in which said conduit and said flow restriction devices are round in cross section, the diameters of said flow restriction devices being approximately one-half the diameter of said conduit.

13. Apparatus for producing aqua ammonia comprising a mixer; means for introducing a liquid comprising water into said mixer; means for introducing anhydrous ammonia into said mixer for being mixed with said liquid; a conduit for receiving the mixture flowing from said mixer and including a T fitting having a central mixture receiving opening, a downwardly directed opening and an upwardly directed opening; a first expansion chamber below said T fitting; a first restricted opening intervening between and providing communication between said downwardly directed opening and the upper part of said first expansion chamber; a second expansion chamber above said T fitting and being closed at its upper end; a second restricted opening intervening between and providing communication between said upwardly directed opening and said second expansion chamber; said second expansion chamber being closed except where it communicates with said second restricted opening, both of said restricted openings being of substantially less flow path cross sectional area than the T fitting openings with which said restricted openings respectively communicate, said first restricted opening, said downwardly directed opening, said upwardly directed opening and said second restricted opening being substantially aligned vertically and in that order from bottom to top; and means for removing the mixture from the lower part of said first expansion chamber.

14. Apparatus according to claim 13 in which said T fitting openings are round, the diameters of said restricted openings being approximately one-half the diameter of said central mixture receiving opening.

References Cited in the file of this patent

UNITED STATES PATENTS

| | | |
|---|---|---|
| 1,216,059 | Bosch | Feb. 13, 1917 |
| 2,023,199 | Harvey | Dec. 3, 1935 |
| 2,743,289 | De Boer et al. | Apr. 24, 1956 |
| 2,872,297 | Dugan | Feb. 3, 1959 |
| 2,901,328 | Knight | Aug. 25, 1959 |